Patented July 17, 1923.

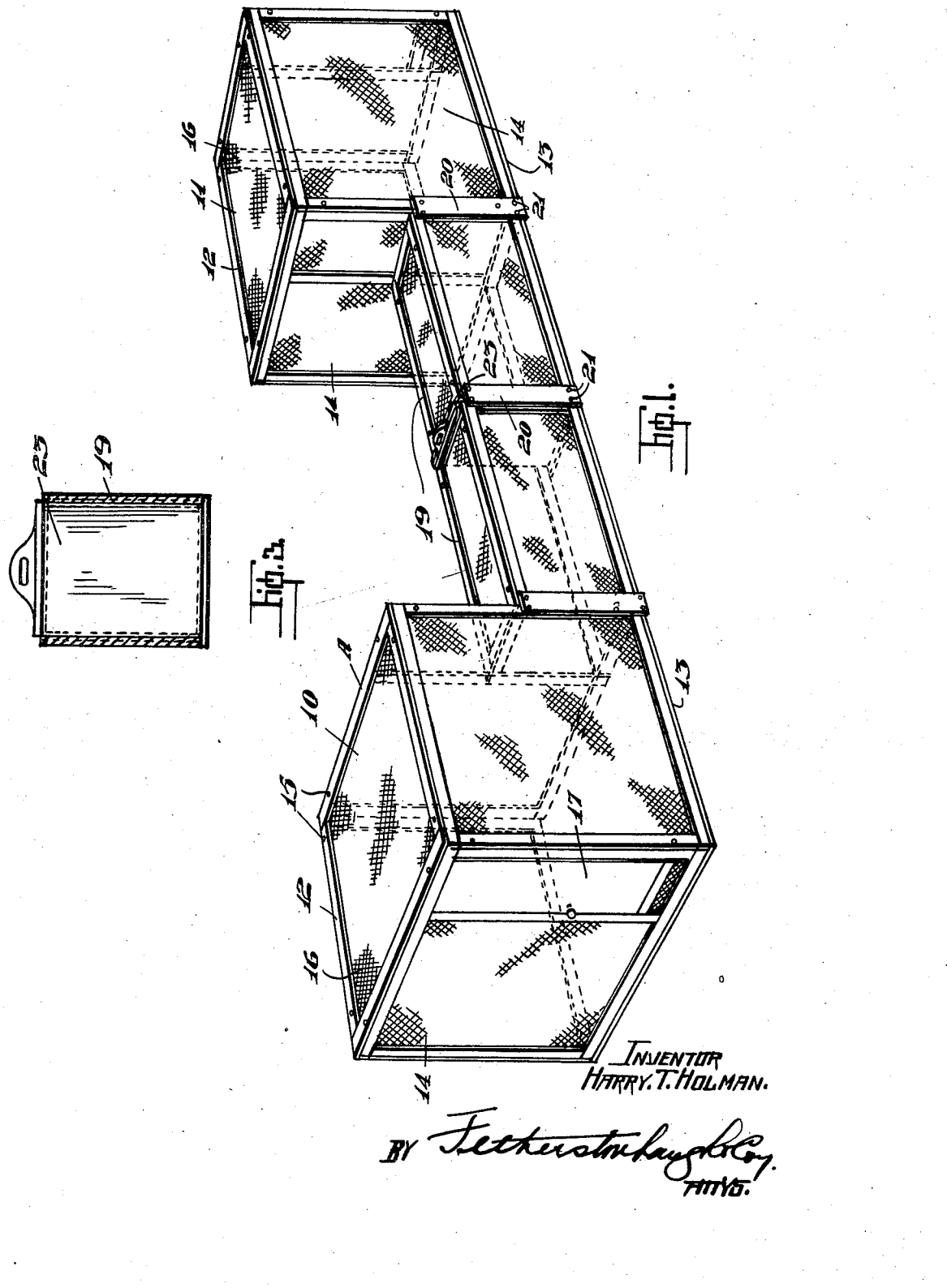

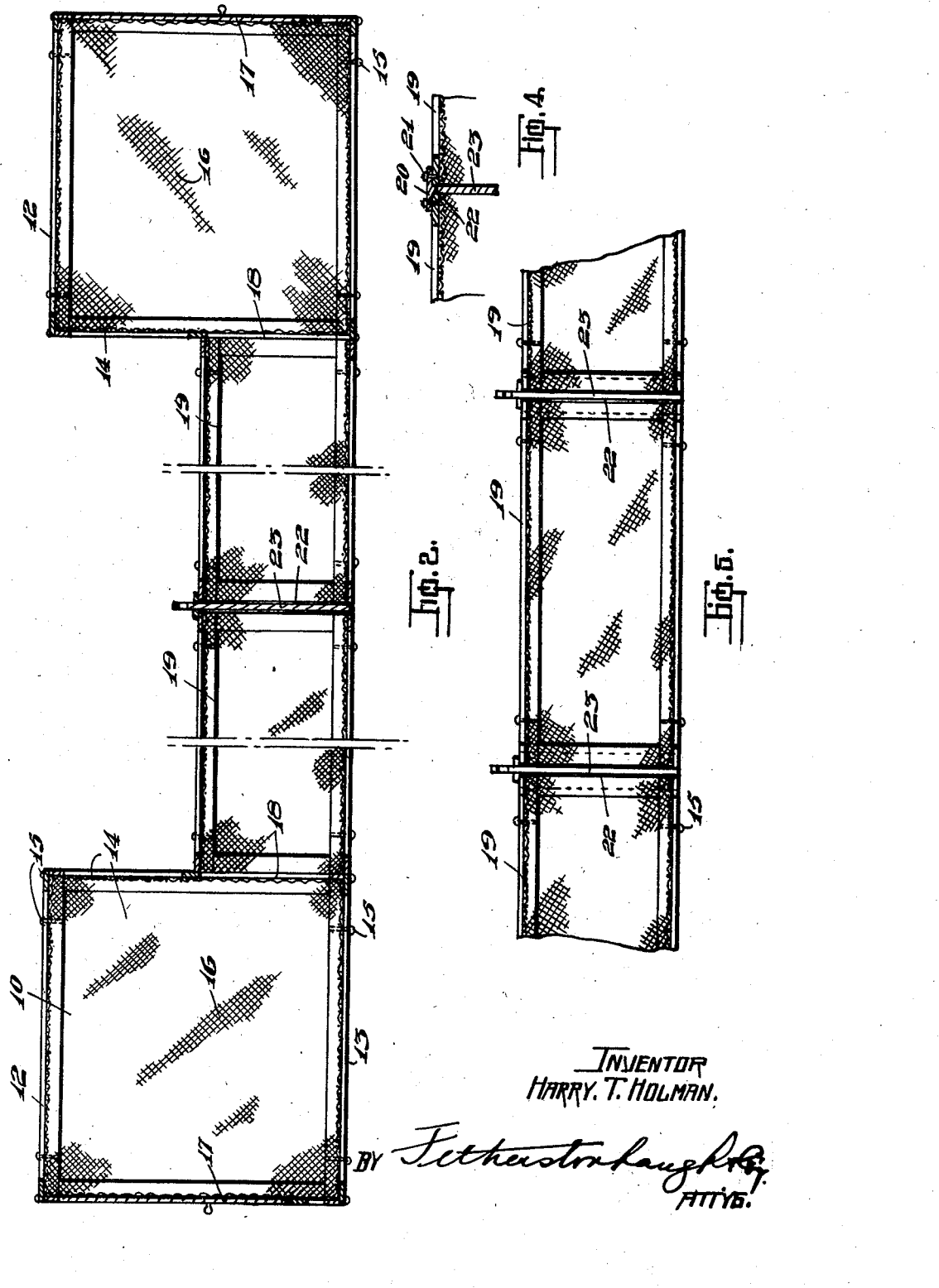

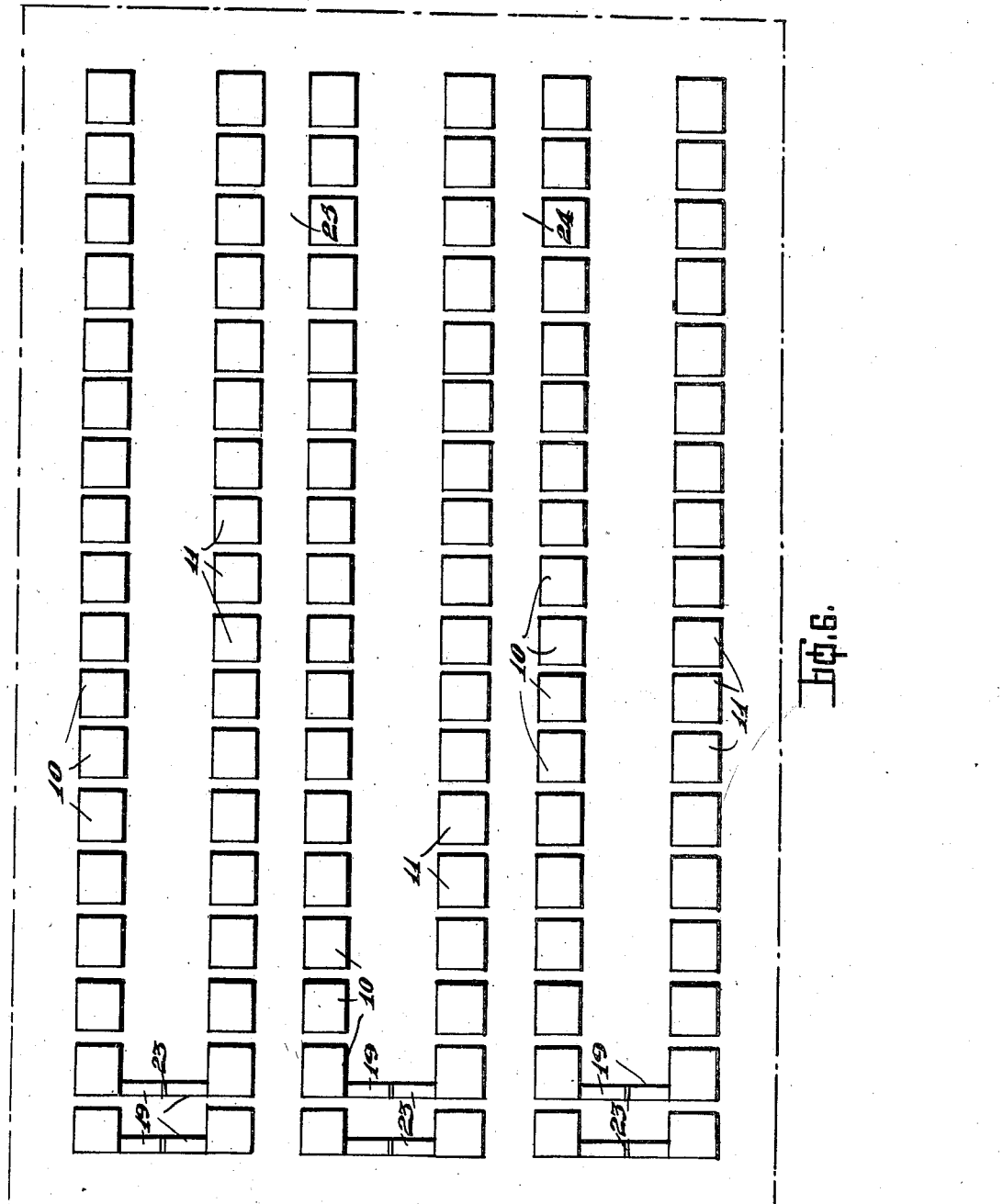

1,462,107

UNITED STATES PATENT OFFICE.

HARRY TINSON HOLMAN, OF SUMMERSIDE, PRINCE EDWARD ISLAND, CANADA.

FOX PEN.

Application filed July 5, 1922. Serial No. 572,966.

*To all whom it may concern:*

Be it known that I, HARRY TINSON HOLMAN, a subject of the King of Great Britain, and resident of Summerside, in the Province of Prince Edward Island, Dominion of Canada, have invented certain new and useful Improvements in Fox Pens, of which the following is a specification.

This invention relates to fox pens, and has for its objects to provide an improved pen, a plurality of which can be so located as to form a ranch.

In the black silver fox breeding industry, the older ranches consist of pens approximately twenty-five feet square by ten feet high, arranged in double or triple rows with corridors for access to each pen on the part of the attendant.

These have been permanent structures with trenches two to four feet deep around each edge of the pen into which was placed a cedar sill to which the wire netting forming the walls was attached. The walls extend about ten feet above the ground with an internal overhang of about eighteen inches to prevent the fox from getting over the top when climbing over the wire. This type is usually located in a grove, which however, after a few years is destroyed due to the foxes burrowing about the roots of the trees.

A later form of pen, which is now in common use, is one entirely enclosed with wire netting which may be called the box type as distinguished from the trench type as described above, the bottom consisting of wire netting lies on the surface or a few inches below the surface of the earth and prohibits the fox burrowing at all. As a rule these pens are located in an open field, as the clearing of the space of twenty-five feet square, which is usually the size of these pens in a wood, cuts off the shade to a great extent.

Both of these types are unsatisfactory from a sanitary point of view, as in the trench type, it is impossible and in the box type, it is inconvenient to move the pens to a new location after the soil has become polluted from the dung and the food left in the pen.

It is the object of my improved fox pen to overcome the disadvantages inherent to the previous types of pens. My improved fox pen comprises two cages, which are formed of demountable frames entirely covered on the inside with wire netting and joined together by means of a runway of wire netting formed of sections, to provide a means of separating the two cages in order to segregate a fox in one of the sections, or to separate the male and female in each of the cages through a sliding door provided between the runway sections.

Still further objects are to provide a fox pen, that is simple in construction, not liable to go out of repair, and generally to adapt the several parts to better perform the functions required of them.

With the above and other objects in view, the invention consists essentially of the improved construction, hereinafter described in detail in the accompanying specification and drawings.

In the drawings;

Figure 1 is a perspective view of an improved fox pen constructed in accordance with my invention.

Figure 2 is a longitudinal section through the same.

Figure 3 is a cross section taken at the connection between two runway sections.

Figure 4 is a sectional detail between two runway sections, and showing the means of retaining the sliding door.

Figure 5 is a longitudinal section taken through the runway sections.

Figure 6 is a diagrammatic view of a ranch formed of the improved fox pens built in accordance with my invention.

Like characters of reference indicate corresponding parts in all the figures.

Referring to the drawings, A represents the improved fox pen comprising two cages 10 and 11. Each of the cages 10 and 11 is formed with detachably connected top and bottom frames 12 and 13, and the side frames 14.

These frames may be connected through any suitable means 15 and are entirely covered on the inside by a wire netting 16. Each of the cages is provided on one of its free faces with a door 17, and on the walls opposite the door 17 is an opening 18 in which is designed to fit the end of a runway section 19.

Two or more of these runway sections 19 are used to connect the two cages 10 and 11, and the abutting ends of every two sections 19 are connected by means of a plate 20 suitably bolted to the runway section frame as at 21.

A space between every two sections is provided as at 22 in order to provide clearance for an upwardly sliding door 23 which may be raised or lowered in order to separate the cages or provide a communication between the two.

If it is desired to inspect one of the animals, one of the sliding doors 23 is lowered and the fox being chased into the section 19, the door 23 at the opposite end of this section is closed, thus segregating the fox in the section.

The sections 19 are also of much use in the breeding season in order to separate the males and females by allowing one of the cages for one, and the second cage for the other.

A suitable ranch may be formed of these improved pens as shown in the diagrammatic view in Figure 6, in which three rows are provided, comprising in all fifty-four pens. For feeding the animals, the attendant passes along the two alleys 24 and 25, and in this case, it may be good to lower the partitions or sliding doors 23 between the cages in order to feed the animals separately so that one will not eat most of the food to the detriment of the other.

This ranch is also of advantage in the breeding season when the males may be placed in the middle row of the pens, while the females are housed in the two outer rows.

Every second year or every year, when it is desired for sanitary purposes to change the location of the cages, one of the cages is detached from the runway sections and moved eight feet (in case the dimensions of each cage are eight feet square) from its former location, and a similar length of runway section is connected to it, the second cage is then moved in the same direction, and the same distance in order to bring it in place for connection with the runway section.

As these cages are comparatively small as compared with the size of the former pens, it is easy to slide the same along, when it is desired to change the location of the cages and the dismantling of the cages is not necessary.

It is also desired to point out as an advantage that the frames are located on the outside of the cages, and that all the inside walls are made of wire netting. By this arrangement it is possible to paint or disinfect the frames without the paint or disinfectant coming in contact with the animal, and injuring its valuable fur. Also by means of this arrangement if two cages be placed adjacent one another, a space will be left between the two walls of wire netting so that one fox will not injure the other through the adjacent walls of the cages.

As many changes could be made in the above construction, and many apparently widely different embodiments of my invention, within the scope of the claims, constructed without departing from the spirit or scope thereof, it is intended that all matter contained in the accompanying specification and drawings, shall be interpreted as illustrative and not in a limiting sense.

What I claim as my invention is:

1. A fox pen comprising two separated portable cages connected by a portable runway, the whole constituting a plurality of demountably constructed sections covered inwardly as to the sides, top and bottom with wire netting, doors for separating the cages and sliding door means for separating the runway sections.

2. In a pen for breeding, rearing and maintaining foxes in captivity, the combination with a pair of separated portable cages provided with doors and comprising demountable sections having the walls, top and bottom wire netted on the inside, of a runway connecting said cages and comprising a plurality of sections similarly netted to the cages and provided with sliding doors between the sections.

3. A fox pen of the character described comprising a pair of separated portable cages connected by a runway, said cages and runway comprising a plurality of demountable sections wire netted on the side, top and bottom, doors for the cages and sliding partition doors between the sections of the runway.

In witness whereof I have hereunto set my hand in the presence of two witnesses.

HARRY TINSON HOLMAN.

Witnesses:
M. PHILIPPA DUGAN,
J. P. CROCKETT.